(12) United States Patent
Yu et al.

(10) Patent No.: US 7,157,402 B2
(45) Date of Patent: Jan. 2, 2007

(54) HCMS CARBON CAPSULE, ELECTROCATALYSTS FOR FUEL CELL SUPPORTED BY HCMS CARBON CAPSULE, AND METHOD OF PREPARING THE SAME

(75) Inventors: Jong Sung Yu, Daejeon (KR); Geun Seok Chai, Daejeon (KR); Suk Bon Yoon, Daejeon (KR)

(73) Assignee: Hannam University, Dajeon (KR)

( * ) Notice: Subject to any disclaimer, the term of this patent is extended or adjusted under 35 U.S.C. 154(b) by 0 days.

(21) Appl. No.: 10/912,043

(22) Filed: Aug. 6, 2004

(65) Prior Publication Data

US 2005/0032635 A1    Feb. 10, 2005

(30) Foreign Application Priority Data

Aug. 6, 2003    (KR)    ...................... 10-2003-0054337

(51) Int. Cl.
  *H01M 4/88* (2006.01)
  *B32B 9/00* (2006.01)
  *B32B 5/16* (2006.01)
  *C01B 31/00* (2006.01)
  *C01B 31/02* (2006.01)

(52) U.S. Cl. ...................... 502/185; 502/101; 502/180; 502/527.24; 428/403; 423/445 R

(58) Field of Classification Search ................ 502/180, 502/185, 527.24, 101; 423/445 R; 428/403
See application file for complete search history.

(56) References Cited

U.S. PATENT DOCUMENTS 4,263,376 A * 4/1981 Blurton ........................ 429/42

(Continued)

FOREIGN PATENT DOCUMENTS

KR    1020020042650    2/2002

(Continued)

OTHER PUBLICATIONS

Yoon et al., "Fabrication of Carbon Capsules with Hollow Macroporous Core/Mesoporous Shell Structures," Advanced Materials, 2002, 14 No. 1, Jan. 4, pp. 19-21.*

*Primary Examiner*—David Brunsman
*Assistant Examiner*—Patricia L. Hailey
(74) *Attorney, Agent, or Firm*—Mayer, Brown, Rowe & Maw LLP

(57) ABSTRACT

The present invention provides a bimodal porous carbon capsule with a hollow core and a mesoporous shell structure, which can be employed as an electrocatalyst support for a fuel cell; electrocatalysts for the fuel cell using the bimodal porous carbon capsule, and a method of preparing the same.

The electrocatalyst according to the present invention has higher catalysis activity as compared with the Pt—Ru or Pt catalyst supported by the conventional carbon black, so that the performance of the fuel cell is enhanced, and it can be easily prepared in an aqueous solution state. According to the present invention, the porous carbon support employed as the support for the catalyst has excellent conductivity and a high surface area, so that the loaded catalyst can be prepared with a smaller amount than that of the conventional carbon black. Further, metal particles having an extremely fine size of 2~3 nm are uniformly distributed on the support, so that the area of an active site at which catalysis reaction is performed is increased, thereby increasing the catalyst activity with respect to the oxidation reaction of the fuel such as methanol, ethanol, hydrogen, etc. Also, a fine pore of a porous carbon support secures a fuel dispersing passage, so that the fuel including alcohol such as methanol, ethanol or the like, hydrogen, etc. can be easily transferred and dispersed, thereby efficiently performing its oxidation-reduction reaction. On the other hand, an air electrode can efficiently function as the catalyst due to the same principle.

2 Claims, 7 Drawing Sheets

U.S. PATENT DOCUMENTS

| | | | | |
|---|---|---|---|---|
| 4,407,906 A | * | 10/1983 | Stonehart | 429/42 |
| 6,686,308 B1 | * | 2/2004 | Mao et al. | 502/180 |
| 2002/0076614 A1 | * | 6/2002 | Yoon et al. | 429/231.95 |
| 2003/0045425 A1 | * | 3/2003 | Ruth et al. | 502/325 |
| 2004/0126354 A1 | * | 7/2004 | Song et al. | 424/76.1 |

FOREIGN PATENT DOCUMENTS

| | | | |
|---|---|---|---|
| KR | 1020020025354 | | 4/2002 |
| KR | 1020030068765 | | 8/2003 |
| WO | WO 2004/064877 | * | 8/2004 |

\* cited by examiner

HCMS CARBON CAPSULE, ELECTROCATALYSTS FOR FUEL CELL SUPPORTED BY HCMS CARBON CAPSULE, AND METHOD OF PREPARING THE SAME

CROSS-REFERENCE TO RELATED APPLICATIONS

This application claims the benefit of Korean Patent Application No. 2003-54337, filed Aug. 6, 2003, in the Korean Intellectual Property Office, the disclosure of which is incorporated herein by reference.

BACKGROUND

1. Field of the Invention

The present invention relates to a carbon capsule with a hollow core and a mesoporous shell (hereinafter, referred to as "HCMS") structure, a catalyst as a fuel electrode (anode) or an oxygen electrode (cathode) of a PEM (polymer electrolyte membrane) fuel cell employing the HCMS carbon capsule as a support material, and a method of preparing the catalyst, and more particularly, to an HCMS carbon capsule having high activity against oxidation reaction of fuel such as methanol, ethanol or hydrogen and against oxygen reduction reaction in a PEM fuel cell including a direct alcohol fuel cell such as DMFC (direct methanol fuel cell), a DEFC (direct ethanol fuel cell) or the like, and a hydrogen fuel cell, a catalyst employing the HCMS carbon capsule as a support, and a method of preparing the catalyst.

2. Discussion of Related Art

A fuel cell is a device directly transforming chemical energy of fuel into electric energy and heat energy through electrochemical reactions. In the fuel cell, there is no combustion process and there is no driving unit, so that energy transformation efficiency is high and environmental problems do not arise. For this reason, researches on the fuel cell have been being carried out in many countries to be used in various applications such as power generation, household power, carriage power, mobile power, etc. since it is developed as a power source for a spacecraft based on a space program of America in the 1960s. As the fuel cell, a direct alcohol fuel cell directly employs methanol or ethanol as fuel, and liquid methanol or liquid ethanol is directly supplied to a fuel electrode (anode), so that the fuel cell can be driven at a relatively low temperature and have a small size, thereby attracting attention as next-generation alternative energy for small mobile power, automobile power, etc. On the other hand, a hydrogen fuel cell attracts attention as an energy source for an automobile, a carriage or the like requiring relatively higher power.

Generally, the cathode and anode electrodes used in the fuel cell are prepared by loading a catalytic metal such as Pt, Pt—Ru alloy or other various active metal alloys in a carbon support.

For example, in the case of an over-the-counter direct methanol or ethanol fuel cell, a fuel electrode thereof employs a Pt—Ru catalyst (e.g., E-TEK Inc.) including catalytic metal such as 60 wt. % Pt—Ru (molar ratio 1:1) loaded in a carbon support such as carbon black (Vulcan XC-72) having a high surface area, or employs Pt—Ru (molar ratio of 1:1) catalytic metal itself without the carbon support. Further, in the case of the over-the-counter direct methanol or ethanol fuel cell, an air electrode thereof generally employs a Pt black catalyst. Generally, as the fuel electrode of the direct alcohol fuel cell, the catalytic metal loaded in the carbon support has excellent activity as compared with the non-loaded catalytic metal. Further, the larger the surface area and the pore volume of the support are, the smaller the size of the catalytic metal to be loaded in the support is. Therefore, in the case where the surface area and the pore volume of the support are large, the catalytic metal can be uniformly distributed in the support, so that the active area thereof is increased and thus the fuel and a reaction product are readily dispersed, thereby enhancing the activity.

Recently, the electrocatalyst employed for oxidation-reduction reaction of the fuel and air in the fuel cell has been prepared by distributing fine particles of the catalytic metal over the support having high conductivity and high surface area such as the carbon black having a surface area of about 230 $m^2/g$ (e.g., Vulcan XC-72 of Cabot Co.). As for enhancing the activity of the fuel cell, the electrocatalysts such as Pt—Ru/C, Pt/C, etc. should satisfy the following characteristics.

First, the particles of the catalytic metal should be small so as to be uniformly distributed on the support, so that the area of an active site at which catalysis reaction is performed is increased, thereby increasing the catalyst activity with respect to the oxidation-reduction reaction.

Second, carbon used for the support should have a porous structure through which gas and water smoothly pass and with which the particles of the catalytic metal are loaded strongly enough to prevent the loaded particles of the catalytic metal from easily separating due to physical and chemical impacts.

Like this, the support used in the electrode of the fuel cells is in need of an optimum porous structure, an excellent electrical conductivity, a high surface area, and large pore volume. Particularly, in the fuel electrode of the direct alcohol fuel cell, the fuel including the methanol and the ethanol mixed with water passes through an electrocatalyst support and is oxidized in a catalyst layer, and thus the electrocatalyst support should be excellent in electrical conductivity and hydrophilicity and should have a uniformly sized and three-dimensionally developed internal porous structure through which the fuel and the gas can smoothly pass. Accordingly, to provide a method of preparing porous carbon excellent in the conductivity and having both the uniform pores and the high surface area, the present inventors have filed Korean Patent Application No. 2000-57082, titled "a method of preparing a porous carbon molecular sieve having a regular size using a liquid carbon precursor", and Korean Patent Application No.2002-8376, titled "a method of preparing a nano capsule structure with a hollowcore and a mesoporous shell", which will be incorporated in the present application.

However, there has not been developed the electrocatalyst supported by the HCMS carbon capsule. Accordingly, research on the electrocatalyst supported by the HCMS carbon capsule is made to enhance the activity of the conventional electrocatalyst of the fuel cell employing the carbon black as the support.

Thus, the present inventors tested the activity of the electrocatalyst prepared by using the HCMS carbon capsule as the support for the cathode and the anode of the PEM fuel cell such as the direct alcohol fuel cell and the hydrogen fuel cell. As a result of the test, the present inventors found out that the electrocatalyst using the HCMS carbon capsule has excellent activity as compared with the conventional catalyst.

SUMMARY OF THE INVENTION

Accordingly, it is an aspect of the present invention to provide a spherical bimodal porous carbon capsule with a macro hollow core and a mesoporous shell structure, which is used as a support for an electrocatalyst of a PEM fuel cell.

Another aspect of the present invention is to provide a catalyst for a cathode and an anode of a PEM fuel cell by loading catalytic metal with the carbon capsule.

Still another aspect of the present invention is to provide a method of preparing a catalyst for a cathode and an anode of the fuel cell.

BRIEF DESCRIPTION OF THE DRAWINGS

These and/or other aspects and advantages of the invention will become apparent and more readily appreciated from the following description of the preferred examples, taken in conjunction with the accompanying drawings of which.

DETAILED DESCRIPTION OF PREFERRED EXAMPLES

Figure 1:
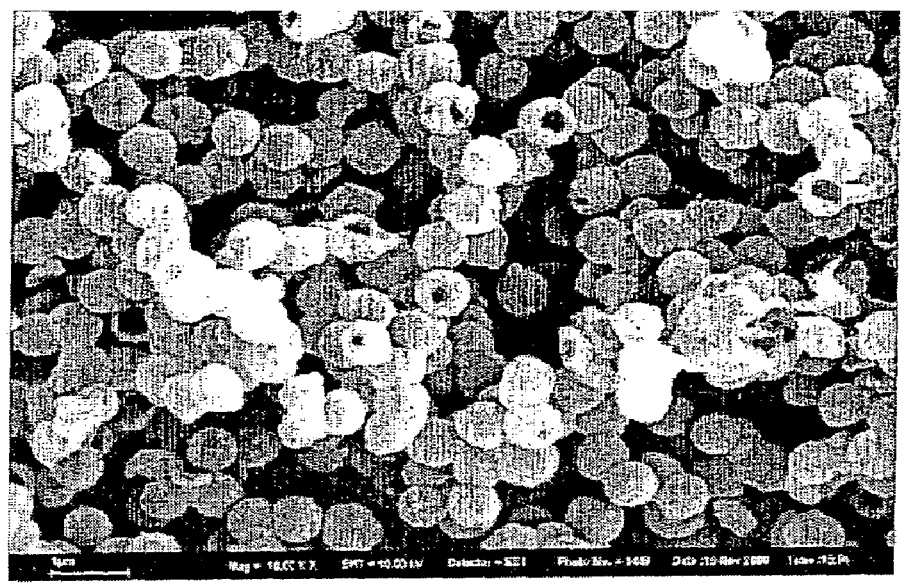
FIG. 1 is an SEM image showing an HCMS carbon capsule having a regular size, prepared according to an example-1 of the present invention.

Hereinafter, preferable examples according to the present invention will be described in detail with reference to the accompanying drawings, wherein the preferred examples of the present invention is provided to be readily understood by those skilled in the art, so that variously other modifications are apparent and the present invention is not limited to the following examples disclosed herein. In drawings, a hatched portion is just used for dividing elements.

According to a first aspect of the present invention, a bimodal porous carbon capsule comprises a macro hollow core and a mesoporous shell structure, and its preparation method is disclosed in Korean Patent Application No. 2002-8376.

The schematic method of preparing the disclosed carbon capsule is as follows. First, spherical silica particles having a uniform size are synthesized. Then, a silica mesoporous shell is formed on the surface of the synthesized silica, thereby forming a silica template particle with a solid core and a mesoporous shell (hereinafter, referred to as "SCMS") structure. Then, a polymer precursor is injected into mesopores formed in the mesoporous shell of the synthesized SCMS silica template particle. At this time, in the case where the precursor is monomer, the precursor is polymerized into a polymer-silica composite. Then, the polymer-silica composite is carbonized into a carbon-silica composite in atmosphere of inert gas at a temperature of 900° C.~1,000° C. Then, the silica template is selectively removed using hydrogen fluoride (KOH) solution, thereby forming a macro hollow core having a uniform size at a place where the silica template is removed. Through these processes, the spherical HCMS carbon capsule is prepared. Here, the mesopores are regularly or irregularly distributed depending on the synthesizing methods.

The hollow core diameter of the carbon capsule can vary by adjusting the size of the silica particle. Also, the shell thickness of the carbon capsule can vary by adjusting the amount of a silica TEOS (tetraethoxysilane or tetraethylorthosilicate) and a surface active-agent such as $C_{18}$-TMS (octadecyltrimethoxysilane) or HTMABr (hexadecyl-trimethylammonium bromide), and adjusting a molar ratio of TEOS to the surface active-agent. Besides, the distribution irregularity of the mesoporous shell can be adjusted as follows. For example, in the case of $C_{18}$-TMS and TEOS, two compounds are hydrolyzed at the same time, so that the mesopores are irregularly formed in the silica shell. In the case of HTMABr and TEOS, HTMABr first forms a regular micell structure on the silica shell and then TEOS is hydrolyzed and polymerized, thereby forming a regular mesopores.

Meanwhile, a carbon precursor used to form a mesoporous shell includes divinyl benzen (DVB), acrylonitrile, phenolic resin, vinyl chloride, vinyl acetate, styrene, methacrylate, methyl methacrylate, ethylene glycol, di-methacrylate, furfuryl alcohol, resorcinol-formaldehyde (RF), sugar and a compound represented as a general formula of $CH_2=CRR'$ (where, R and R' belong to an alkyl group or an aryl group, mesophase pitch, or material carbonized into graphitic carbon, by way of example but not limited to.

A radical polymerization initiator used for polymerize the carbon precursor includes, azobisisobutyronitrile (AIBN), t-butyl peracetate, benzoyl peroxide, acetyl peroxide, lauryl peroxide, and one selected among initiators generally used in radical polymerization reaction, by way of example but not limited to.

Besides, another method of preparing the HCMS carbon capsule is described in Korean Patent Application No. 2002-8376.

According to the second aspect of the present invention, an electrocatalyst for a fuel cell comprises a catalytic metal loaded in a spherical bimodal porous HCMS carbon capsule.

According to the second aspect of the present invention, a spherical bimodal porous carbon capsule, used as a support for an electrocatalyst of an fuel cell, comprises a macro hollow core having a uniform internal diameter of 30 nm or more, preferably having an internal diameter of 30 nm to 1,000 nm, and a shell comprising a mesopore having a regular diameter ranging from 2 nm to 8 nm. This spherical bimodal porous carbon capsule itself can be not only employed as a catalyst but also variously employed as an absorbent, a separation and purification agent, a small container for encapsulation of hydrogen and drugs, and an electrode.

According to the second aspect of the present invention, the catalyst for the fuel cell includes metal selected from a group consisting of platinum (Pt), ruthenium (Ru), rhodium (Rh), molybdenum (Mo), osmium (Os), iridium (Ir), rhenium (Re), palladium (Pd), vanadium (V), tungsten (W), etc. For example, the catalyst for the fuel cell not only includes a general catalytic metal such as a single-metal like Pt; binary alloy like Pt—Ru alloy, but also may include ternary alloy like Pt—Ru—Rh alloy, quaternary alloy like Pt—Ru—Mo—W alloy, and other multi-alloys catalytic metals. Such metals are loaded in the carbon capsule by minimum 5 wt. % of total weight of the catalyst, or maximum 80 wt. % or more, preferably by 5 wt.% to 95 wt. %. That is, the spherical bimodal porous carbon capsule of the present invention can load metal of about four times weight as much as its own weight. This is because the spherical bimodal porous carbon capsule of the present invention has eight times or more surface area per unit weight as much as the conventional carbon black support has. Thus, the carbon capsule according to the present invention can support not only more catalytic metal particles but also smaller catalytic metal particles than those supported by the conventional carbon black, so that noble metals are efficiently utilized, thereby increasing economic efficiency.

In general, as for preparing the electrocatalyst, the smaller a loading ratio of the catalytic metal in the support is, the more the supports to load the same amount of the catalytic metal are needed. On the other hand, the carbon capsule support according to the present invention can load the catalytic metal therein with a relatively high loading ratio as compared with the conventional carbon black support, so that the amount of the support for loading the same amount of the catalytic metal therein can be decreased by half, that is, the relatively small amount of catalyst is used. Besides, the amount of the catalytic metal can be loaded by 5 wt. % of total weight of the catalysts. Thus, the amount of the catalytic metal to be loaded can vary within wide ranges as necessary.

Further, the spherical bimodal porous carbon capsule used in the catalyst of the present invention comprises a three-dimensionally well developed macro hollow core having a regular size and an inner diameter of about 50 nm and larger, and a three-dimensionally well developed mesopore shell having a regular size and a diameter of about 2 nm~8 nm, so that the fuel can be freely supplied and dispersed and therefore easily arrive at the surface of the catalyst, thereby allowing the reaction to be active and the reaction product to be easily discharged.

For example, in the case of the Pt—Ru/carbon electrode with 80 wt % metal loading, prepared by employing the bimodal porous HCMS carbon capsule according to the second aspect of the present invention as the support, the activity thereof is excellent as compared with the over-the-counter electrocatalysts such as Pt—Ru (molar ratio 1:1, e.g., E-TEK, 60 wt. % loaded metal) even though the amount of the porous carbon is decreased by 20 wt. % or below with respect to total weight of the catalysts in the case of the HCSM carbon capsule (e.g., decreased by about 50 wt. % with respect to the conventional carbon black).

The electrocatalyst of the PEM fuel cell according to the second aspect of the present invention is prepared as follows. The preparation method comprising: a) dissolving a water-soluble salt of the catalytic active metal in water; b) injecting an aqueous slurry of the spherical bimodal porous HCMS carbon capsule in a reaction container, and mixing the slurry with the solution of the metal salt; c) adding water to make the water-soluble metal salt to have a concentration of 1 mM to 3 mM, preferably of about 2 mM, and diluting and stirring it; d) adding basic or acidic aqueous solution to the reaction solution, and allowing the reaction solution to have a pH of 8 to 9; e) adding a reducing agent to the reaction solution and forming a precipitate; and f) recovering the catalyst.

As described above, the electrocatalysts for the fuel cell according to the second aspect of the present invention can be prepared by relative simple processes without complicated processes. For example, carbon dispersion solution and the reducing agent are slowly added to the metal salt solution at a room temperature while being stirred, so that the reduced catalytic metal particles are uniformly distributed on the spherical porous carbon capsule support having a high surface area and a pore volume, and the catalytic metal particles can have an extremely small size of 2 nm~3 nm.

In the method of preparing the electrocatalyst for the fuel cell according to the third aspect of the present invention, the water-soluble salt of the catalytic active metal at the "a)" step may be acidic or basic. As an example, the water-soluble salt of platinum includes $H_2PtCl_6$, the water-soluble salt of ruthenium includes $RuCl_3$. Such a metal salt can be stoichiometrically determined according to the amount of metal to be loaded in the support of the catalyst to be prepared. For example, in the case of the Pt—Ru alloy, the moral ratio thereof can be stoichiometrically calculated. Further, the concentration of the water-soluble metal salt to be dissolved in the water can be determined by water-solubility according to the kinds of the salt. The time taken to prepare the aqueous solution may vary according to the solubility, the concentration, the dissolving temperature, etc. of each metal salt. Generally, it is sufficient that the metal salt in water is stirred for twenty minutes to one hour.

At the "b)" step of the method according to the third aspect of the present invention, the aqueous slurry of the spherical bimodal porous carbon capsule, i.e., the support is prepared by adding a predetermined amount of the carbon support to water of 100 ml and stirring it. At this time, the aggregated support is divided into the support particles by stirring. If necessary, sonication may be applied in addition to the stirring step so as to stripping air from the pore of the support. Here, the slurry is provided in a separate container and then mixed with the metal salt solution in the reaction container.

At the "c" step of the method according to the third aspect of the present invention, the molar concentration of the metal salt is calculated with the concentration of the metal salt with respect to total water contained in the metal salt solution and the slurry, and introduced by other sources. Further, the metal salt solution is diluted to have a predetermined concentration in order to prevent the metal particles from being aggregated each other and getting bigger when the catalytic metal is precipitated by the reduction reaction of the following steps. Here, a suitable stirring time is about one to two hours.

At the "d" step of the method according to the third aspect of the present invention, the reaction solution is adjusted to have a predetermined pH in order to make the following reduction reaction be smoothly performed. In this pH adjustment, acidic or basic solution may be used.

At the "e" step of the method according to the third aspect of the present invention, the catalytic metal of the water-soluble salt state is reduced and precipitated on the support. Here, the reducing agent includes $NaBH_4$ aqueous solution, $LiBH_4$ aqueous solution, and $AlBH_4$ aqueous solution, preferably $NaBH_4$ aqueous solution. Further, the reducing agent is overdosed as compared with the molar number of metal to be reduced. For example, the $NaBH_4$ aqueous solution is overdosed enough to produce $H^-$ by ten times as much as the molar number of the metal.

At the "f" step of the method according to the third aspect of the present invention, the catalyst precipitated and produced on the support by the reduction reaction of the prior "e" step is separated and recovered. Here, the catalyst particles are precipitated by leaving the reaction solution, and separated upper liquid is thrown away, and the remained precipitate is repeatedly cleaned with water and then dried, wherein the cleaning process is needed to remove foreign material such as chlorine contained in the water-soluble metal salt.

Unless not mentioned, the above steps are performed under room temperature and atmospheric pressure. Further, the foregoing water preferably includes distilled water or deionized water.

Hereinbelow, the preferred examples of the present invention will be described in more detail, but not limited to.

EXAMPLE 1

A HCMS carbon capsule is prepared as follows according to the method disclosed in Korean Patent Application No. 2002-8376.

A spherical silica particle is synthesized to have a diameter of about 133 nm, and then a $TEOS/C_{18}$-TMS mixture is used on a surface of the spherical silica particle to form a shell and then heat-treated, thereby forming a silica template particle with a solid core and a mesoporous shell. Thereafter, a DVB carbon precursor is injected into the pores of the mesoporous shell, and then polymerized by an AIBN polymerization initiator, thereby forming a polymer-silica composite. Then, the polymer-silica composite is carbonized into a carbon-silica composite in atmosphere of inert gas at a temperature of 900° C.~1,000° C. Then, the silica template is selectively removed by hydrogen fluoride (HF) solution, thereby forming a macro hollow core having a regular size at a place where the silica template is removed. Thus, the spherical HCMS carbon capsule is prepared. Here, the above-mentioned method of preparing the carbon capsule is described in the example-6 of Korean Patent Application No. 2002-8376.

Figure 2A:
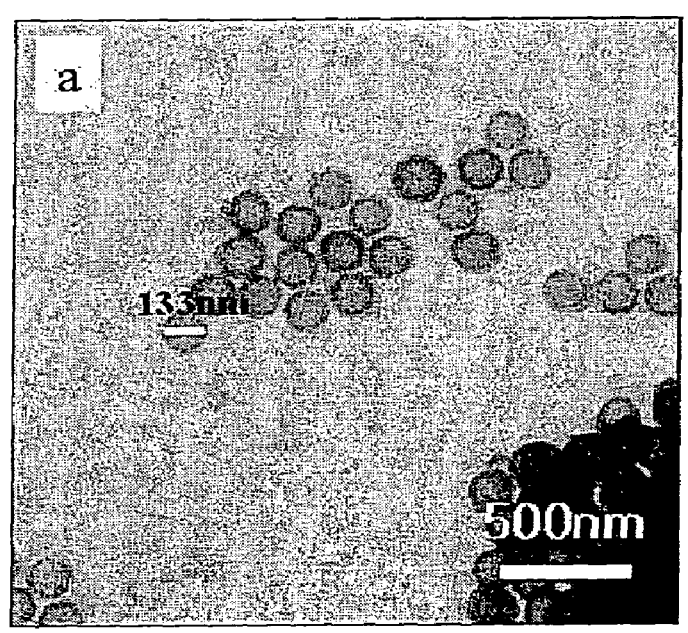
FIG. 2A is a TEM image showing the HCMS carbon capsule having a hollow core diameter of about 133 nm, prepared according to the example-1 of the present invention.

The HCMS carbon capsule is shown in FIGS. 1 and 2A as SEM and TEM images. Further, as a result of measurement using a BET (Brunauer-Emmett-Teller) method, the surface area of the HCMS carbon capsule is about 2,000 $m^2/g$, which shows that the HCMS carbon capsule is increased in the surface area by about eight times as much as the conventional carbon black.

Figure 2B:
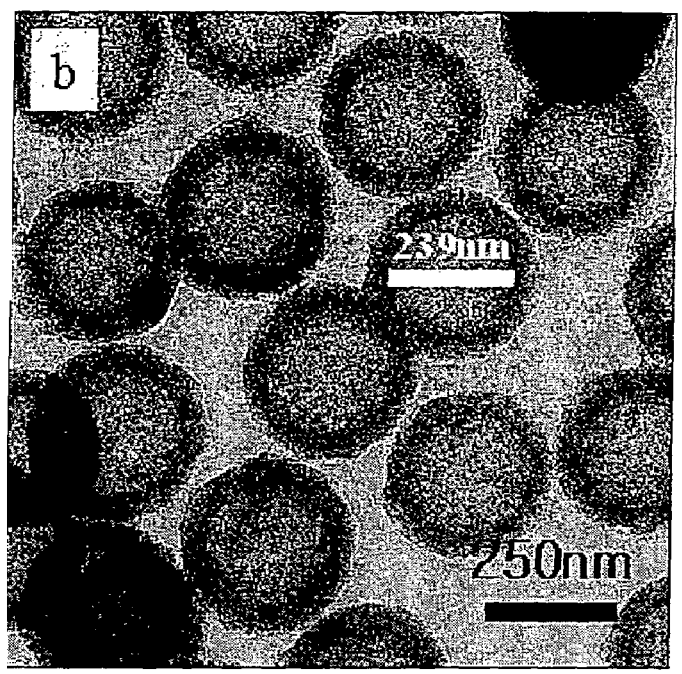
FIG. 2B is a TEM image showing the HCMS carbon capsule having a hollow core diameter of about 239 nm, prepared according to the example-1 of the present invention.
Figure 2C:
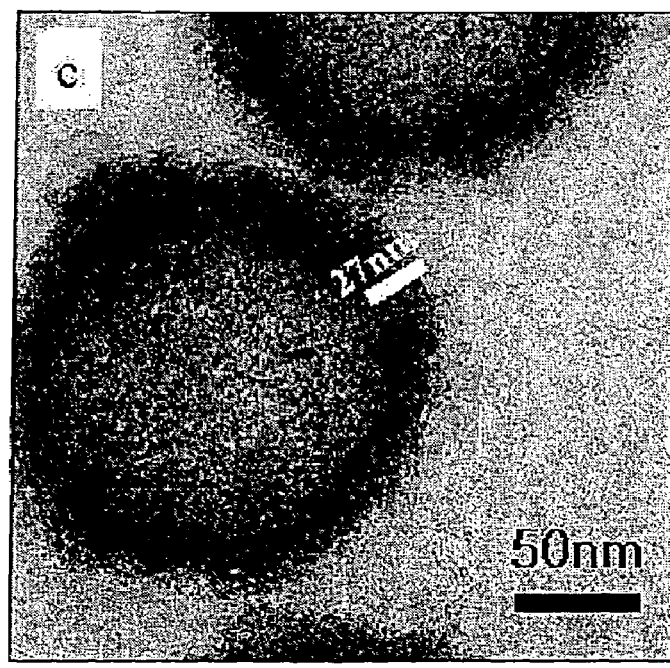
FIG. 2C is a TEM image showing the HCMS carbon capsule having a shell thickness of about 27 nm, prepared according to the example-1 of the present invention.
Figure 2D:
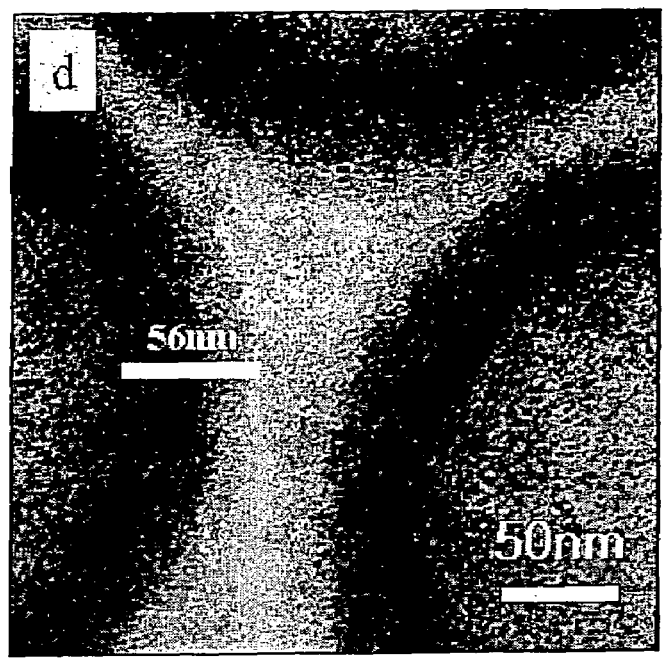
FIG. 2D is a TEM image showing the HCMS carbon capsule having a shell thickness of about 56 nm, prepared according to the example-1 of the present invention.
Figure 2E:
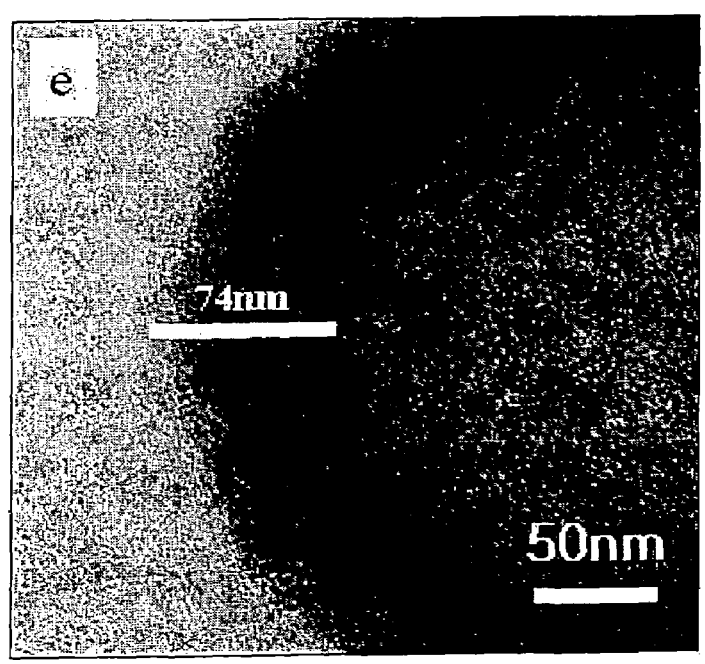
FIG. 2E is a TEM image showing the HCMS carbon capsule having a shell thickness of about 74 nm, prepared according to the example-1 of the present invention.

Through the same processes, the HCMS carbon capsule having a hollow core diameter of about 239 nm is prepared (referring to a TEM image of FIG. 2B); and the HCMS carbon capsule having a shell thickness of about 27 nm (carbon precursor: furfuryl alcohol), 56 nm (carbon precursor: phenolic resin), and 74 nm (carbon precursor: sugar) are prepared (referring to TEM images of FIGS. 2C through 2E).

As depicted in the TEM images, such HCMS carbon capsule have a regular size meso pores that are non-uniformly developed on the shell of the SCMS silica template, thereby causing the HCMS carbon to have non-uniform distribution of the meso pores.

EXAMPLE 2

Contrarily to the example-1, the SCMS silica template having a regular meso pore and the HCMS carbon capsule to have uniform distribution of the meso pores are synthesized as follows. First, 400 ml of distilled water, 200 ml of ethanol, 50 ml of ammonia water of 28% are mixed in an 1 L of reaction container of, and then a predetermined amount of silica having a diameter of 230 nm is dispersed in this mixed solution. Then, the solution of 4.3 g of surface active-agent (HTMABr) dissolved in 40 ml of distilled water and 20 ml of ethanol is added in the foregoing mixed solution. After adding the surface active-agent into the reaction container, the mixed solution is rapidly stirred for about 30 minutes, thereby forming a micell on a surface of the silica particle. Then, 4.3 ml of TEOS is added herein and then rapidly stirred for about 12 hours. An as-synthesized sample is cleaned with 0.1M HCl/EtOH solution to partially remove the surface active-agent, and then calcined in a tube furnace with air at a temperature of 550° C. for seven hours, thereby completely removing the remained surface active-agent. The as-synthesized sample is an SCMS silica template of which a core is filled with silica and surrounded with the regular mesoporous shell. Here, the size of the meso pore and the shell thickness can be controlled by adjusting the amount of HTMABr and TEOS.

Figure 3A:
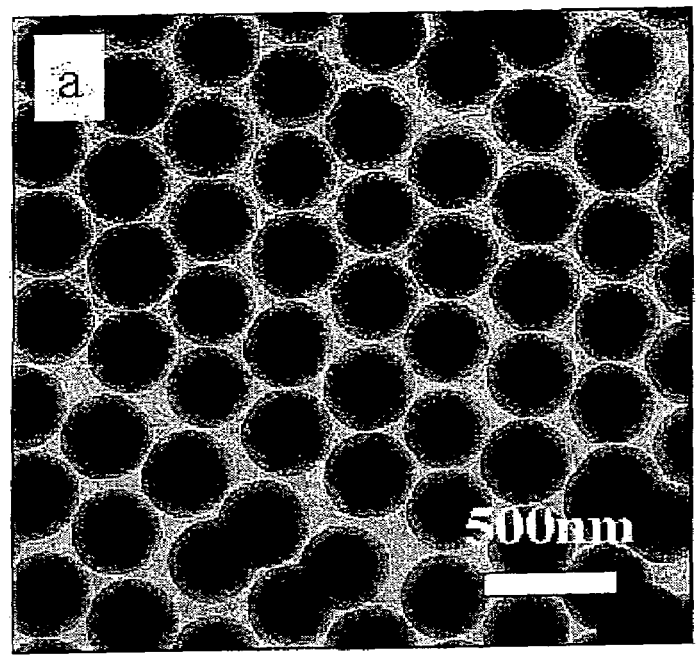
FIG. 3A is a TEM image showing an SCMS silica, of which a core silica particle has a diameter of about 230 nm, prepared according to an example-2 of the present invention.
Figure 3B:
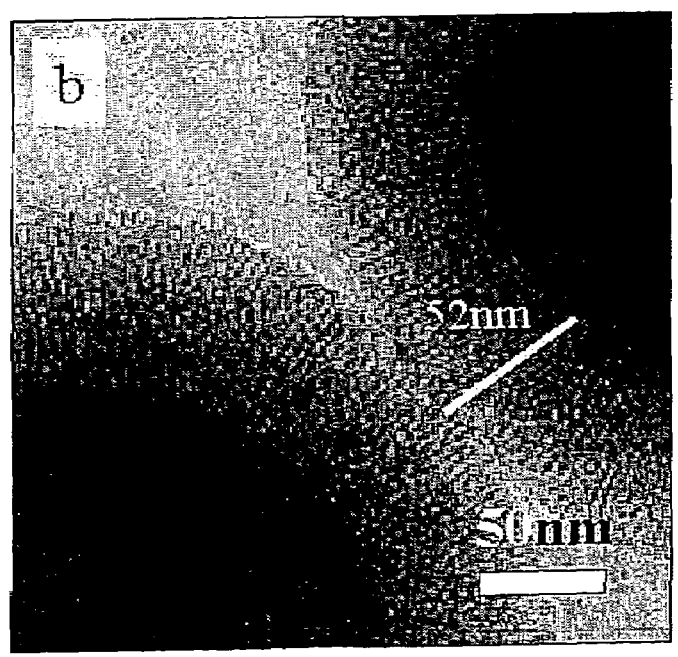
FIG. 3B is a TEM image showing the SCMS silica, of which a regularly distributed mesoporous shell has a thickness of about 52 nm, prepared according to the example-2 of the present invention.

Further, the carbon capsule having the regular mesoporous shell can be synthesized with the carbon precursor and using acrylonitrile by a method similar to the example-1. The prepared SCMS silica having the regular meso pore, and a HCMS carbon capsule with the regular meso pore prepared using the SCMS silica are shown in a TEM image of FIGS. 3A and 3B, respectively. Also, FIG. 3B shows that the SCMS silica structure has a shell with a regularly distributed meso pore.

Figure 3C:
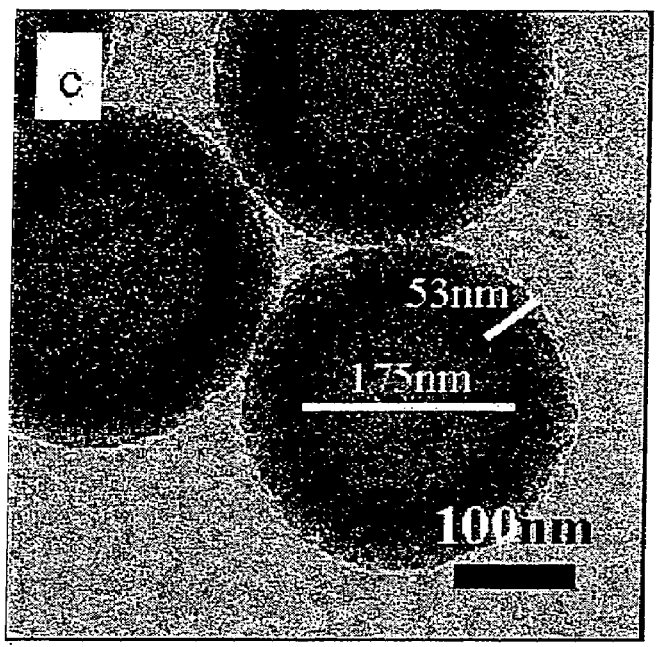
FIG. 3C is a TEM image showing an HCMS carbon capsule prepared by removing the SCMS silica according to the example-2 of the present invention, which has a hollow core diameter of about 175 nm and a shell thickness of about 51 nm.

FIG. 3C is a TEM image showing an HCMS carbon capsule synthesized using acrylonitrile as the carbon precursor, which has a hollow core diameter of about 175 nm, a shell thickness of about 51 nm, and a regularly distributed meso pore.

EXAMPLE 3

To make a molar ratio of Pt:Ru be 1:1, 0.9544 g of $H_2PtCl_6$ (Aldrich reagent, 40.88 wt. % Pt) and 0.4109 g of $RuCl_3$ (Aldrich reagent, 40.88 wt. % Pt) are added to 80 ml of distilled water in a 250 ml-beaker, and then dissolved by stirring it for 30 minutes, thereby forming metal salt solution. Then, the metal salt solution is poured into a 3 L-Erlenmeyer flask. Further, the HCMS carbon capsule of 0.1481 g (corresponding to 20 wt. % of total amount of the carbon capsule and the catalyst to be loaded in the carbon capsule) prepared in the example-1 is mixed with 150 ml-distilled water in a separate 250 ml-beaker, and then stirred for 30 minutes, thereby preparing the slurry. The slurry is slowly added to the aqueous metal salt solution filled in the 3 L-Erlenmeyer flask while being stirred, which is diluted by adding the distilled water to make the metal salt have a total concentration of about 2 mM and then stirred for 1 hour. Then, this solution is adjusted to have a pH of about 8.5, using NaOH solution of 20 wt. %. Thereafter, 40 ml of aqueous solution dissolved with 1.6 g of $NaBH_4$ is slowly added to the metal salt-carbon capsule mixed solution, and stirred for about two hours. After stirred, this solution is left, thereby precipitating a solid. When the upper layer is limpid, this solution is filtrated using a 0.2 μm-nylon filtration sheet. Then, the remained solid is repeatedly cleaned with the distilled water and dried at a temperature of 80° C., thereby preparing the Pt—Ru alloy catalyst.

Figure 4:
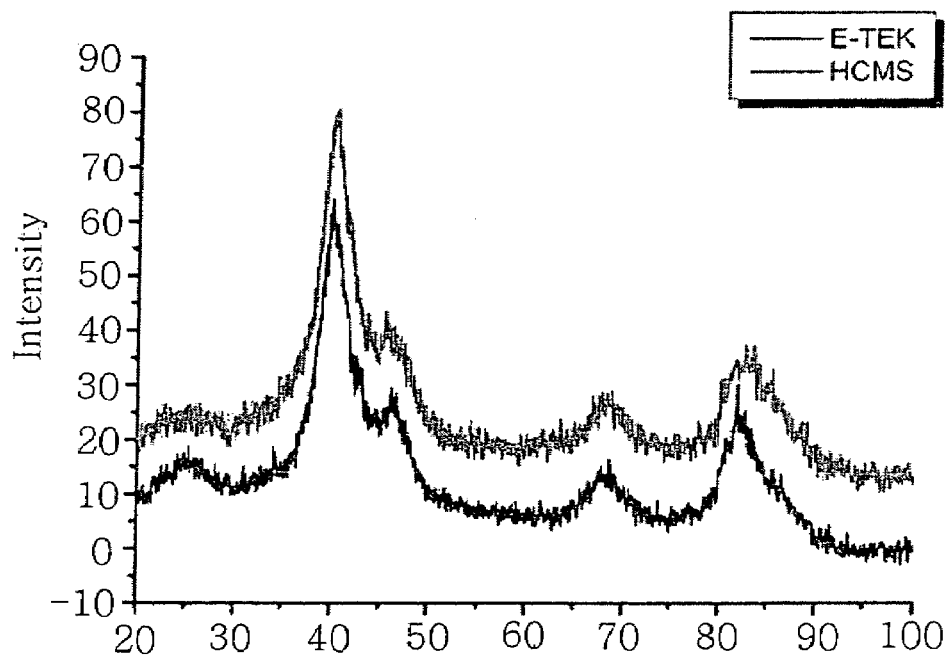
FIG. 4 is a graph showing an X-ray diffraction pattern of a Pt—Ru alloy catalyst employing a spherical HCMS carbon capsule prepared according to an example of the present invention as a support and an X-ray diffraction pattern of a commercial Pt—Ru alloy catalyst (E-TEK)

FIG. 4 is a graph showing an X-ray diffraction pattern of the Pt—Ru alloy catalyst as compared with an X-ray diffraction pattern of a commercial Pt—Ru (molar ratio of 1:1) alloy catalyst (60 wt. % loaded metal, E-TEK). Referring to FIG. 4, a Pt-metal crystal having a 2θ of about 68° corresponds to a surface (2, 2, 0), and thus it is possible to analogize that the catalyst prepared according to the present invention forms the Pt—Ru alloy like the commercial Pt—Ru catalyst of E-TEK. Further, a peak of the catalyst according to the present invention is broader than that of the catalyst according to E-TEK, which shows that the metal particles are small than that of the catalyst according to E-TEK. According to calculation, the metal particle has a size of 2 nm to 3 nm.

Figure 5:
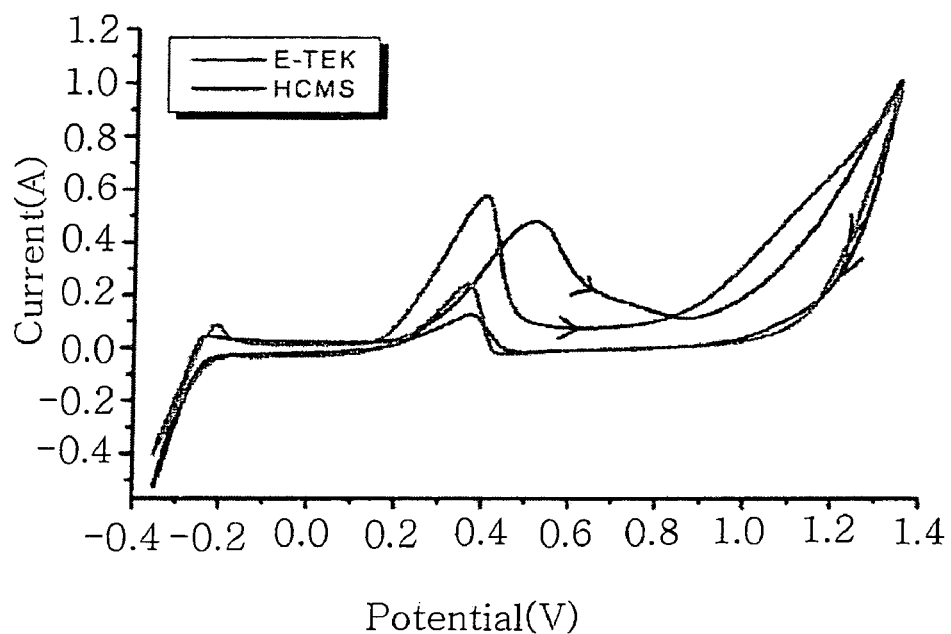
FIG. 5 is a cyclic voltammogram showing catalytic activity against a methanol oxidation reaction of a $Pt_{50}$—$Ru_{50}$ alloy catalyst employing the spherical HCMS carbon capsule prepared according to an example of the present invention as the support as compared with that of the commercial $Pt_{50}$—$Ru_{50}$ alloy catalyst (E-TEK)
Figure 6:
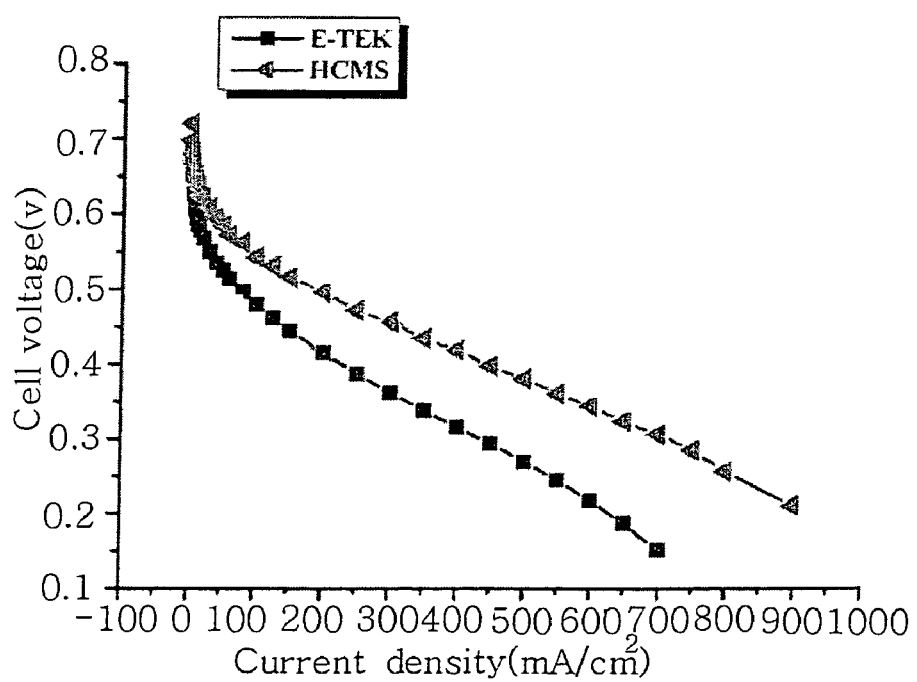
FIG. 6 is a graph showing cell voltage with respect to current density at a temperature of 70° C. of the $Pt_{50}$—$Ru_{50}$ alloy catalyst employing the spherical HCMS carbon capsule prepared according to an example-3 of the present invention as the support as compared with that of the commercial $Pt_{50}$—$Ru_{50}$ alloy catalyst (E-TEK)
Figure 7:
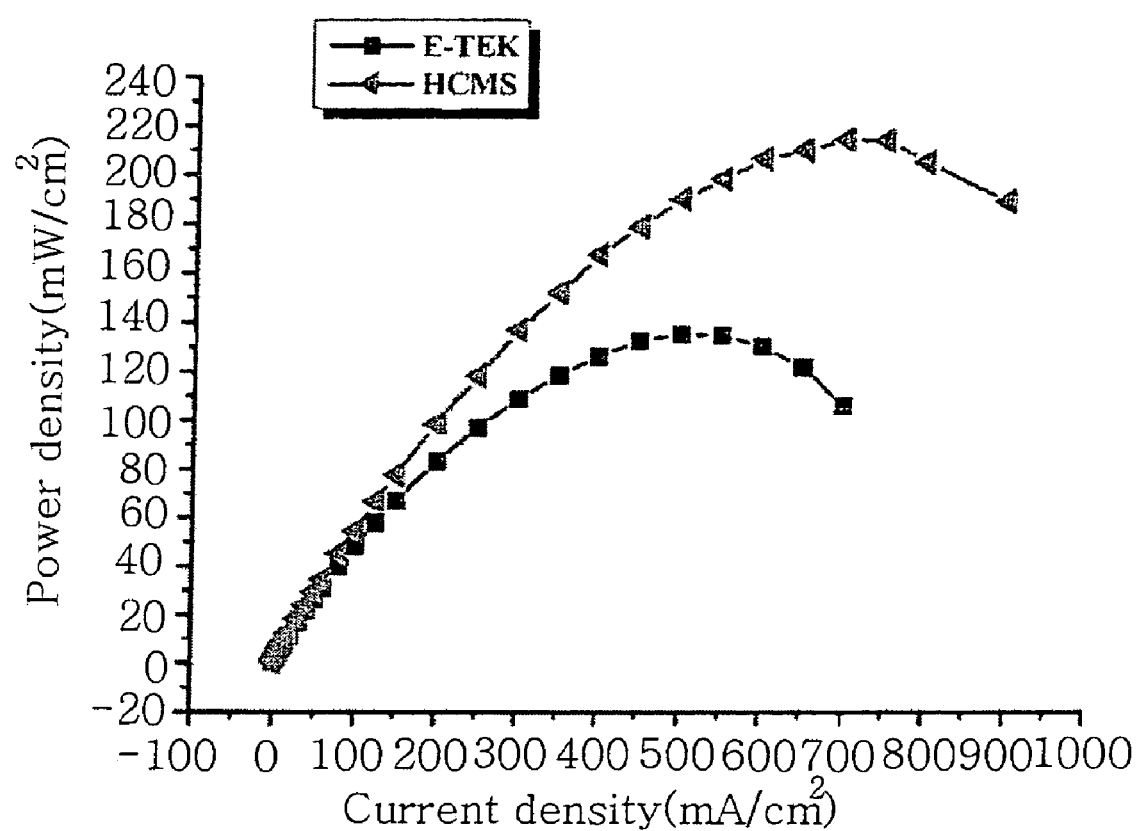
FIG. 7 is a graph showing power density with respect to current density at a temperature of 70° C. of the $Pt_{50}$—$Ru_{50}$ alloy catalyst employing the spherical HCMS carbon capsule prepared according to the example-3 of the present invention as the support as compared with that of the commercial $Pt_{50}$—$Ru_{50}$ alloy catalyst (E-TEK).

Further, the methanol oxidation reaction performance of the Pt—Ru alloy catalyst obtained according to an example of the present invention is tested through cyclic voltammetry (CV) and unit cell performance tests, and these test results are shown as a graph in FIGS. 5, 6 and 7. Referring to FIG. 5, the present catalyst has a narrow peak in a lower voltage level as compared with the commercial catalyst of E-TEK. Thus, the catalyst according to an example of the present invention has excellent activity in the methanol oxidation reaction.

Also, FIG. 6 is a graph showing cell voltage variation with respect to current density variation of the catalyst according to an example of the present invention as compared with that of the commercial catalyst of E-TEK. Referring to FIG. 6, the catalyst according to an example of the present invention has higher cell voltage than that of the commercial catalyst of E-TEK.

Further, FIG. 7 is a graph showing power density variation with respect to the current density variation of the catalyst according to an example of the present invention as compared with that of the commercial catalyst of E-TEK. Referring to FIG. 7, the catalyst according to an example of the present invention has higher power density than that of the commercial catalyst of E-TEK.

Thus, according to the present invention, the Pt—Ru alloy catalyst prepared by employing the bimodal porous carbon capsule as the support has excellent activity with respect to the methanol oxidation reaction as compared with the commercial catalyst of E-TEK.

As described above, the present invention provides a bimodal porous carbon capsule with a hollow core and a mesoporous shell structure, which can be employed as an electrocatalyst support for a fuel cell; electrocatalysts for the fuel cell using the bimodal porous carbon capsule, and a method of preparing the same.

The electrocatalyst according to the present invention has higher catalytic activity as compared with the Pt—Ru or Pt catalyst supported by the conventional carbon black, so that the performance of the fuel cell is enhanced, and it can be easily prepared in an aqueous solution. According to the present invention, the porous carbon support employed as the support for the catalyst has excellent conductivity and a high surface area, so that the loaded catalyst can be prepared with a smaller amount than that of the conventional carbon black. Further, metal particles having an extremely fine size of 2~3 nm are uniformly distributed on the support, so that the area of an active site at which catalysis reaction is performed is increased, thereby increasing the catalyst activity with respect to the oxidation reaction of the fuel such as methanol, ethanol, hydrogen, etc. Also, a fine pore of a porous carbon support secures a fuel dispersing passage, so that the fuel including alcohol such as methanol, ethanol or the like, hydrogen, etc. can be easily transferred and dispersed, thereby efficiently performing its oxidation-reduction reaction. On the other hand, an air electrode can efficiently function as the catalyst due to the same principle.

Although a few examples of the present invention have been shown and described, it would be appreciated by those skilled in the art that changes may be made in this example without departing from the principles and spirit of the invention, the scope of which is defined in the claims and their equivalents.

What is claimed is:

1. A method of preparing an electrocatalyst for an PEM fuel cell, the method comprising:
    a) dissolving a water-soluble salt of a catalytic metal in water;
    b) injecting an aqueous slurry of a spherical bimodal porous carbon capsule with a hollow core and a mesoporous shell structure in a reaction container, and mixing the slurry with the solution of the metal salt;
    c) adding water to make the water-soluble metal salt have a concentration of 1 mM to 3 mM, and diluting and stirring the mixture of water and the water-soluble metal salt;
    d) adding basic or acidic aqueous solution to the reaction solution, and allowing the reaction solution to have a pH of 8 to 9;
    e) adding a reducing agent to the reaction solution and forming a precipitate; and
    f) recovering the catalyst by leaving and precipitating the reaction solution, repeatedly cleaning the precipitate with water, drying the precipitate.

2. The method according to claim 1, wherein the water-soluble salt of the catalytic metal at the a) step includes $H_2PtCl_8$ or $RuCl_3$.

* * * * *